HIGH SPEED SHEET STACKING SYSTEM

Filed April 10, 1961

3 Sheets-Sheet 1

Dec. 22, 1964 E. G. PERRY, JR 3,162,438

HIGH SPEED SHEET STACKING SYSTEM

Filed April 10, 1961 3 Sheets-Sheet 2

Dec. 22, 1964 E. G. PERRY, JR 3,162,438

HIGH SPEED SHEET STACKING SYSTEM

Filed April 10, 1961 3 Sheets-Sheet 3

United States Patent Office 3,162,438
Patented Dec. 22, 1964

3,162,438
HIGH SPEED SHEET STACKING SYSTEM

Edward Gordon Perry, Jr., Dallas, Tex., assignor, by mesne assignments, to Sperry Rand Corporation, New York, N.Y., a corporation of Delaware Filed Apr. 10, 1961, Ser. No. 102,023
11 Claims. (Cl. 271—71)

This invention relates to material handling apparatus and more specifically to a high speed document stacking system.

In document stacking systems in which flexible sheets are fed into a stacking wheel characterized by spiral slots or spiral extensions, operation has been characterized by relatively low limits as to speed capabilities because of the nature of the feed and extracting systems therefor. However, in the development of high speed document processing systems where speeds are such that a plurality of documents may be handled in each second, it has been found that prior art systems are wholly inadequate. Failure at such high speeds results in an immediate breakdown of the stacking operations and possible mutilation of the documents involved so that precise control is necessary both in delivery of documents to and removal of documents from the stacking mechanism.

It is an object of this invention to provide a stacking apparatus capable of handling documents at a high speed without missing or jamming. It is a further object of the invention to provide a stacking apparatus capable of handling without adjustment intermixed documents of various sizes.

It is a further object of this invention to provide apparatus in which the stacking function is not critically dependent upon precisely synchronized document arrivals.

It is a further object of this invention to provide apparatus capable of placing documents into a neat, uniformly aligned stack.

It is a still further object of this invention to provide document stacking apparatus in which stacks of accumulated documents may be removed without halting the stacking operation.

In accordance with the present invention, there is provided a high speed stacking mechanism which is characterized by a disk means having a plurality of arcuate slots extending inwardly from the perimeter thereof. The disk means is mounted for rotation about its center. There is then provided a sheet material or document delivering system which inserts a document into one slot in the disk at a speed in excess of the speed of the perimeter of the disk and substantially tangentially with respect to the disk for developing a centrifugal braking force between the surface of the document and the outer surface of said slot. By developing such a braking force, the motion of the document relative to the disk itself is arrested. The disk then can continue to rotate carrying the document with it to an extracting station. At an extracting station a bar extends inwardly of the perimeter of the disk means substantially to the inner limit of the slots and at a substantial angle with respect to the surface of any slot in registration with the bar for contacting the end of the document to move the same outwardly.

In accordance with a further aspect of the invention, a document receiving bin is provided with means for maintaining the documents extracted from the disk means in contact with the outer edge of the disk means to maintain and position a document stack.

In accordance with a more specific aspect of the invention, there is provided a pair of disks each having a plurality of arcuate slots extending inwardly from the perimeters of each disk. The disks are mounted with pairs of the slots in alignment and are mounted for rotation about a common axis. A document conveyor means is provided which terminates at least in part within the perimeter of the disks and between them for delivering a document into said pairs of slots substantially tangentially of the disk means at a velocity in excess of the velocity of the perimeter of the disks for developing a frictional braking force between the surfaces of the documents and the outer surfaces of the slots to arrest the motion of the documents relative to the disk means.

The stacking mechanism is adapted to engage each document at the leading edge thereof as it is transported by the disks from a loading station to an extracting station and to apply to said leading edge a force tending to tilt the document in the plane thereof. A stacking bin including a side element and a movable stop forming planar surfaces mutually perpendicular with respect to each other and with respect to a bin surface of said extracting bar are provided for maintaining the documents extracted from the disks with the leading edge resting on said surface of said extracting bar, one side supported by the side element, one face of the stack supported by the stop and the other face of the stack engaging the surfaces of the disks.

For a more complete understanding of the present invention and for further objects and advantages thereof, reference may now be had to the following description taken in conjunction with the accompanying drawings in which.

Figure 1:
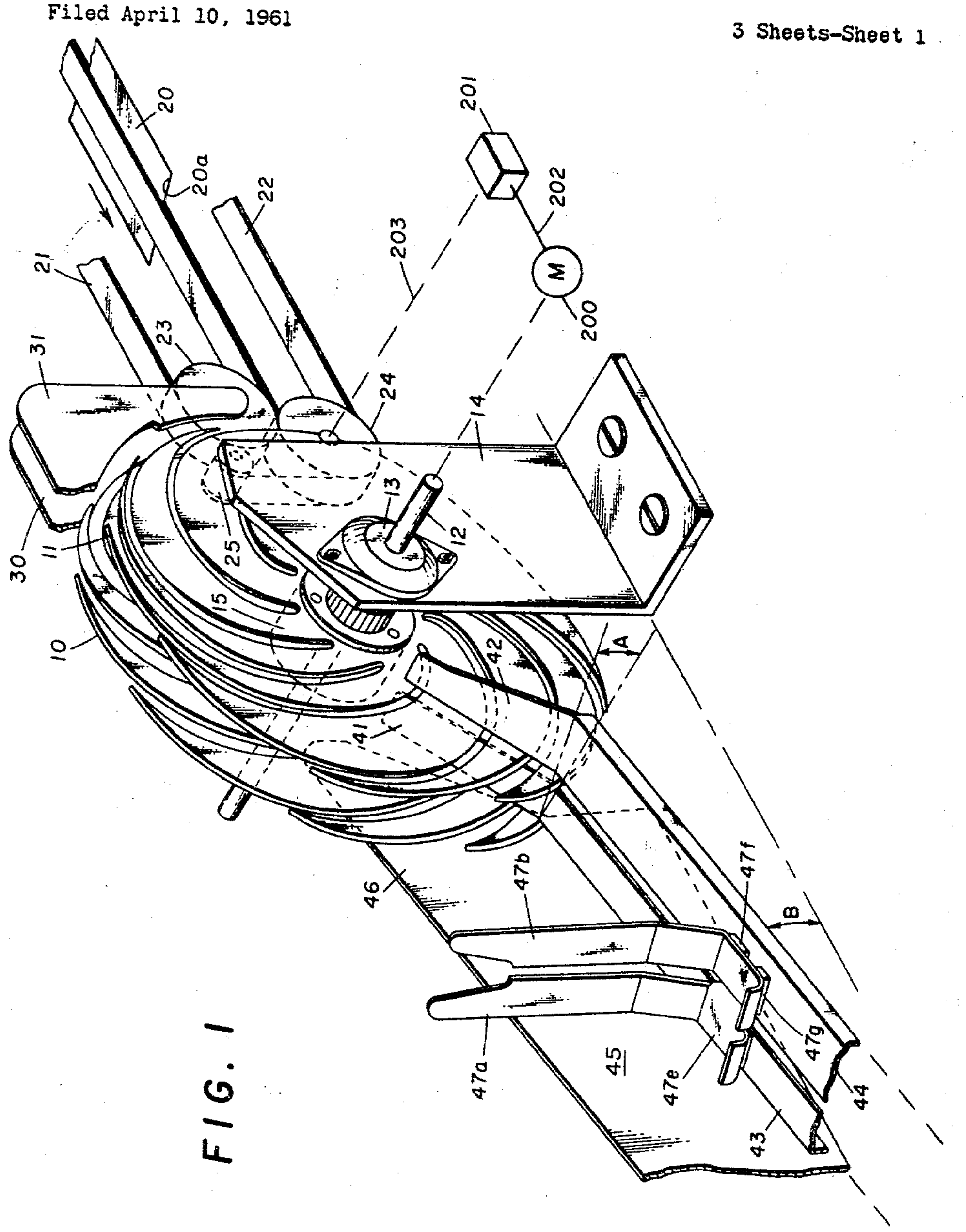
FIG. 1 is an isometric view of a single stacking unit with delivering and extracting mechanisms.

Referring now to FIG. 1, there is illustrated a pair of disks 10 and 11 mounted for rotation on a shaft 12 which is journaled in bearings such as bearing 13 which in turn is mounted on a support 14.

Both of the disks 10 and 11 are provided with a plurality of arcuate slots extending inwardly from the perimeter thereof. For example, each of the disks in the embodiment illustrated in FIG. 1 has eight slots. The slots terminate substantially short of the hub 15 which serves to secure the disks 10 and 11 together to form a unitary structure.

The disks are adapted to cooperate with a document feeding system and document extracting system receiving documents traveling in tandem and stacking them on end in a stack from which documents may be removed without interrupting the stacking operation. More particularly, a document such as a check 20 of the usual bank draft variety is driven towards the disks 10 and 11 between the adjacent surfaces of an upper belt 21 and a lower belt 22. Belt 21 passes around a pulley 23. The belt 22 passes over an idler pulley 24 and around a smaller pulley 25. The document 20 approaches the disks 10 and 11, traveling along approximately a radial path. The belts 21 and 22 feeding over pulleys 23, 24 and 25 abruptly deviate direction of travel of the document 20 so that each such document is fed into one of the arcuate slots in the disks 10 and 11. In practice, documents will be fed toward disks 10 and 11 in tandem so that as the disks rotate each slot may receive a single document.

A pair of guides 30 and 31 are positioned adjacent the perimeter of the disks 10 and 11 to guide the documents into the slots and prevent them from being bent over the sharp points formed at the opening of each slot.

A motor 200 is mechanically coupled to shaft 12 to drive the disks 10 and 11 at a predetermined peripheral velocity. The motor 202 is illustrated as coupled to a speed changing device 201 such as a gear box or the like by means of linkage 202. The unit 201 is then connected by way of linkage 203 to the shaft upon which the pulley 24 is mounted, thus diagrammatically indicating synchronous operation as between the drive for the belts 21 and 22 and the disks 10 and 11. The belts thus driven serve to deliver documents into the slots in disks 10 and 11 tangentially whereupon there is developed a braking force between the outer surface of the document and the outer surface of the slots thereby to arrest motion of the documents relative to the disks.

More particularly, the velocity with which the document 20 approaches the disks 10 and 11 is substantially in excess of the peripheral velocity of the disks 10 and 11 so that the documents are driven or are inserted into the slots at a velocity which initially is relatively high as compared with the velocity of the perimeter of the disks 10 and 11. This being so, the velocity of the document initially is even greater than the velocity of the edges of the spirals since they are of progressively smaller diameter than the perimeter. Thus there is developed a substantial frictional force between the outer surface of the document 20 and the outer surfaces or edges of the arcuate slots in the disks 10 and 11. The centrifugal force tending to maintain intimate contact between the surface of the document 20 and the edges of the spirals thus tends to arrest the travel of document 20 relative to the disk 10. The operation is such that by proper regulation of speed of belts 20 and 21, the rotational speed of the disks 10 and 11, and the geometrical configuration or curvature of the slots, each document will be arrested in its travel before the leading edge thereof reaches the end of a given slot. This arresting of the motion is accomplished within a given segment of travel path within a given slot which is dependent upon the mass of the document and its length. Ordinarily for documents such as bank drafts the motion will be arrested within about a half a revolution of the disks 10 and 11.

As the disks 10 and 11 continue to rotate with documents positioned in some or all of the arcuate slots therein, the documents encounter a pair of fixed stripping bars such as the bars 41 and 42. As the disks continue to rotate, the point of registration between the upper surfaces of the stripping bars 41 and 42 and a given slot moves outwardly away from the shaft 12, thus forcing the document from its slot while moving it in a radial direction. The action is such that the document is maintained in a position with the leading edge **20*a* down. Upon complete extraction, the document is positioned substantially vertically. The document rides down the stripping bars 41 and 42 onto the plane surface of a pair of bin members 43 and 44 which cooperate with a side element 46 forming a guide surface. It will be noted that both the bin members 43 and 44 and the stripping bars 41 and 42 lie in planes which are tilted relative to the shaft 12. They are so tilted that the corners of the document 20 remote from the side element 46 will first be contacted by the stripping bar 42. A force is thus developed which tends to tilt the document into contact with the bin side wall 46**.

As will hereinafter be shown in more detail, the plane common to the upper surfaces of the bin member 43 is tilted with respect to the axis of shaft 12 as indicated by the angle A and also is tilted as indicated by the angle B with respect to a horizontal plane represented by the surface **14*a* of the support 14. The surface 45 of the bin side wall 46 is perpendicular to the plane of bin members 43 and 44**.

Thus each document is first tilted into contact with the surface 45. As each document then moves radially from the disks 10 and 11, it slides down the surface 45, the downward motion being arrested by members 43 and 44. By this action it is assured that each document is aligned at the edges thereof adjacent to member 46 and at the edges resting on members 43 and 44. The documents are forced from their slots by contacting the stripper bars 41 and 42 with force being applied to the inner face of each document by the inner edges of each slot. Thus they are placed in the stacking bin with the leading edge **20*a*** down.

While shown only schematically in FIG. 1, a pressure plate 47 is mounted for movement along the length of the stacking bin and is resiliently urged against the back of the stack of documents so that the documents are maintained in contact with the outer edges of the disks 10 and 11, thus maintaining them in order. As additional documents are stripped from the stacking unit, the pressure plate 47 moves down the bin away from the disks. All or any portion of a given stack once delivered from the disks 10 and 11 may be removed from the bin without interrupting stacking operation.

Thus in one embodiment of the present invention, documents such as bank checks were stacked at the rate of about 20 per second. The capacity of the system is dependent upon the speed of the belts 20 and 22 and the sizes of the disks 10 and 11 relative to the size of the document to be accommodated. However, high speed operations have been found to be reliable for such document stacking operations.

The system has been found to be capable of accepting and stacking documents of various widths and lengths so that sales slips or other documents may be accommodated. The American Banking Association has established specifications as to the tolerance permitted in document size for their particular operations. The specifications currently adopted require a document width to be within the limits of 2¾" to 3⅔", length between 6" and 8¾" and thickness between 0.003" and 0.007". The present system has operated satisfactorily with documents at the extremes of the foregoing specifications and beyond. More particularly, documents have been handled successfully having widths of 4½". Minimums in length below 6" are possible. Lengths beyond 8¾" may be handled by proper proportioning of the arcuate slots and the relative delivery and braking speeds. Documents of thickness beyond the range have also been accommodated. The invention is therefore considered capable of carrying out any desired operation by modifying, where necessary, the specific system illustrated and described herein in view of applicant's teachings. In each case documents are stacked on end, neatly aligned with one edge positioned against the side 46 of the bin, the end being supported by members 43 and 44.

Thus the invention broadly contemplates a stacking mechanism in which disk means having a plurality of arcuate slots extending inwardly from the perimeter thereof is mounted for rotation about the disk centers. A document delivering mechanism is provided for inserting documents into the slots tangentially at a speed which initially is substantially greater than the peripheral speed of the disk means for developing a frictional braking force between the surface of the document and the outer surface of the slots in the disk means. Thus the travel of the document relative to the disk is arrested. Thereafter the extracting bars 41 and 42 are employed to contact the leading edge of each document, the inner surface of each arcuate slot serving to force the document from the slot into an end-up stack of documents in the stacking bin.

Figure 2:
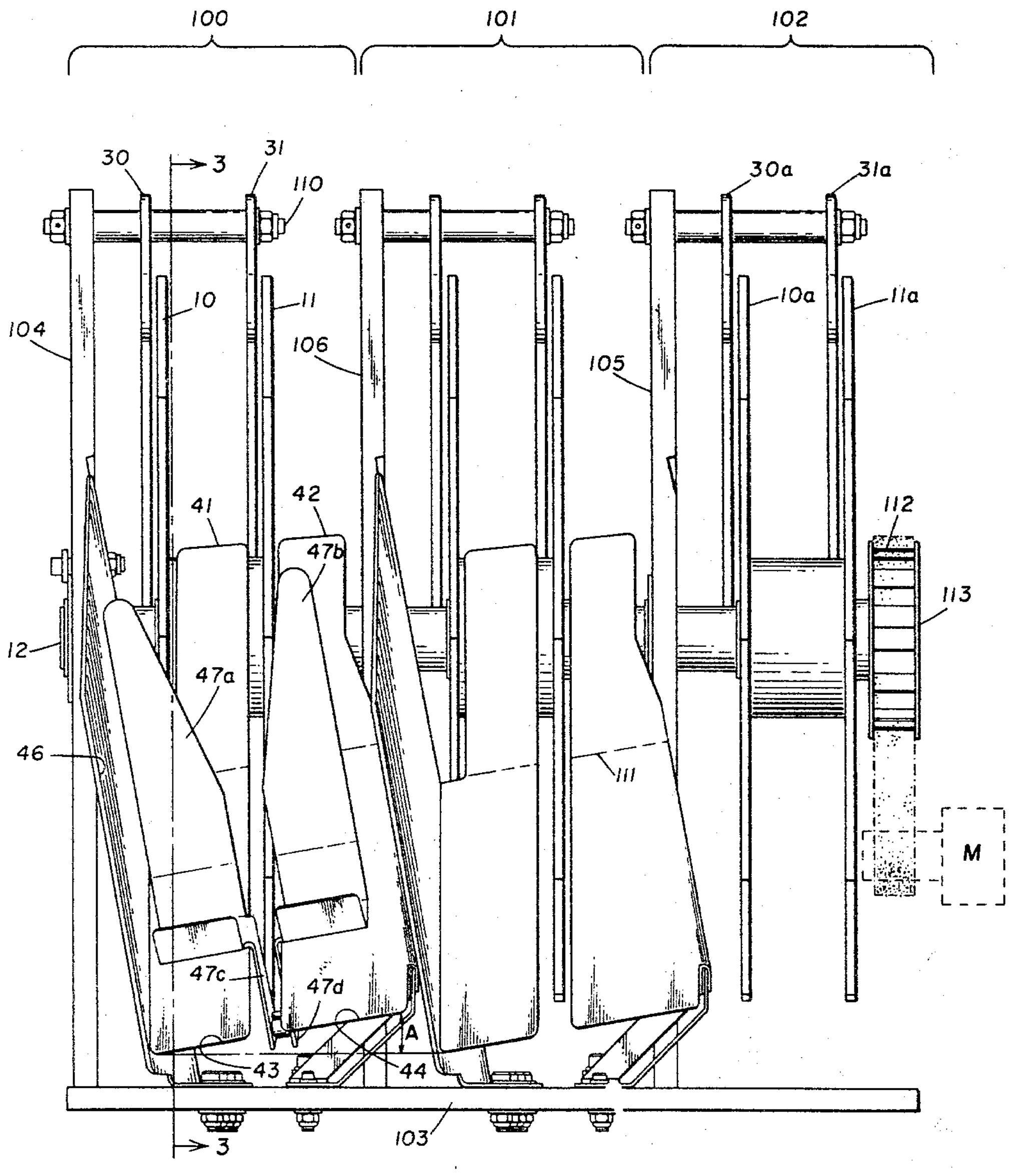
FIG. 2 is an end view of a multistacking unit.
Figures 3, 4, 5:
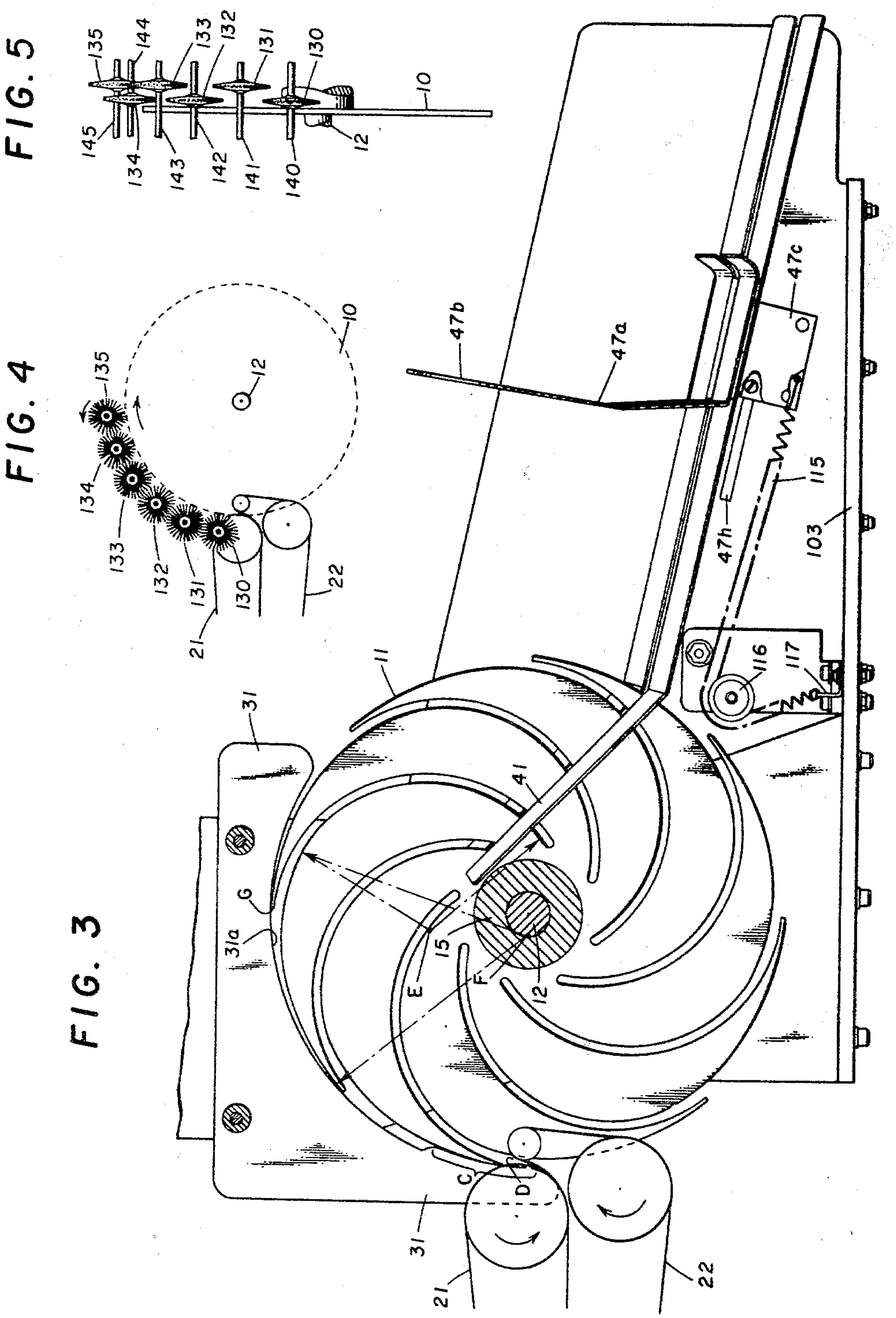
FIG. 3 is a sectional view taken along the line 3—3 of FIG. 2.
FIG. 4 illustrates a modified document guiding mechanism.
FIG. 5 illustrates mounting of one brush of FIG. 4.

Having described the invention in connection with the schematic drawing of FIG. 1, it will now be helpful to an understanding of the invention and the construction of the system to refer to the more detailed drawings of FIGS. 2 and 3.

In FIGS. 2 and 3 like parts have been given the same reference characters as in FIG. 1 for ease of understanding. Referring now to FIG. 2, three pairs of disks are illustrated as comprising a stacking unit subassembly for a multichannel sorting system. A plurality of subassemblies such as shown in FIG. 2 may be assembled to form a complete document stacking system capable of receiving documents from a multichannel sorting system. Such capabilities are required where a stack of documents representing a plurality of accounts are assembled in random order and are to be processed through an accounting or tabulating system and sorted so that all documents representing a given account will ultimately be placed in one of the selected bins. This type of operation is typical in the processing of banking documents. In such systems it is generally the case that from 10 to 20 stacking bins will be provided. In such case four or more subassemblies such as illustrated in FIG. 2 would be operated as a unit for sorting and stacking operations.

The disks 10 and 11 of FIG. 1 are illustrated as in the left hand section, i.e., section 100 of FIG. 2. A second pair of disks is included in section 101, and a third pair of disks is included in section 102. Sections 100–102 are mounted on a base plate 103. A pair of side plates 104 and 105 are provided together with a center plate 106 for the support of the various pieces of equipment auxiliary to the stacking disks themselves and for support of the central shaft 12. As seen in FIG. 2, the pressure plate 47 of FIG. 1 is formed from a pair of elements 47*a* and 47*b*. Element 47*a* is provided with a downwardly extending tab 47*c*. Similarly, the element 47*b* is provided with a downwardly extending tab 47*d*. As best seen in FIG. 1, the element 47*a* has a foot 47*e* from which the tab 47*c*, FIG. 3, depends. A pad 47*f* is secured to the bottom of the foot 47*e* at the front thereof, that is, adjacent the upright portion. A second pad 47*g* is secured to the back and rear edge of the foot 47*e*. Preferably the pad 47*f* is of material such that frictional forces will be developed between its lower surface and the bottom of the stacking bin whereas the pad 47*g* is such as to develop relatively high frictional forces. The functions of pads 47*g* and 47*f* will further be explained later but serve to assist in maintaining a proper attitude for the stack of documents positioned against the upright portion of the pressure plate 47*a*. A bar 47*h* is secured to the tab 47*c* and extends forward of the face of the pressure plate 47*a* to prevent the pressure plate from tilting backwards under the weight of a stack of documents. As seen in FIG. 2, the plates 47*a* and 47*b* are secured together by means of screws extending through the tabs 47*c* and 47*d*. The tabs extend downwardly in the slot between the confronting edges of the two bottom plates 43 and 44 for the stacking bin.

Again it is noted that the bottom plates 43 and 44 of the stacking bin are tilted to the left as viewed in FIG. 2. The side plate 46 of the stacking bin extends upwardly at a right angle with reference to the bottom plates 43 and 44 so that the documents as delivered finally to the stacking bin will be tilted at the angle A.

As best seen in connection with section 101, FIG. 2, the bottom plates 43 and 44 and the extractor bars 41 and 42 are formed from two pieces which are bent along line 111.

In section 102 both the stacking bin and the pressure plate have been removed so that the disks 10*a* and 11*a* can more clearly be seen relative to the guide plates 30*a* and 31*a*. It will be noted that the disks in all three sections 100–102 are driven by a belt 112 carried by a pulley 113. Pulley 113 is accurately synchronized or interlocked with the belts 21 and 22 which transport documents to the system.

It will be noted that the extracting bars 41 and 42 are merely planar extensions of the bottom elements 43 and 44, respectively. The extracting bar 41 extends upwardly between the disks 10 and 11 whereas the bar 42 extends upwardly on the side of disk 11 opposite the disk 10. The insertion guides 30 and 31 are mounted on a bolt 110 which extends from and is supported by the side plate 104.

Referring now to FIG. 3, it will be seen that the extractor tab 41 extends upwardly above the shaft 12 and hub 15. Thus documents fed between belts 21 and 22 are forced by the lower tip of the guide plate 31 into one of the spiral-like slots in the disk 11. It will be noted that the edge 31*a* of the guide plate 31 lies generally outside the periphery of the wheel 11 except for that portion C near the tip. More particularly, over the zone C the guide plate 31 extends inside the perimeter of the disk 11 to make certain that the leading edge of each document will be fed into one of the slots. A delivery mechanism driving belts 21 and 22 feeding documents to the stacking mechanism may thus be synchronized either exactly or approximately with the rotation of the disk 11 so that the leading edge of the document will pass from between belts 21, 22 at point D just after the tip marking the opening into an arcuate slot has passed behind the edge of the guide plate 31. It is to be understood that exact synchronization is not necessary since there is some latitude permissible by reason of the fact that the documents travel at a speed which initially is substantially greater than the peripheral speed of the disks 10 and 11. The latitude permissible in synchronization is actually represented by the segment C of the periphery. A given document is forced to enter a given slot during the interval that the tip marking the entry to the slot is within the limits of the segment C.

As the documents are extracted from the slotted disk, they are stacked against the pressure plate 47. As previously indicated, the pressure plate 47 is resiliently urged against the stack of documents so that the last document placed in the stack will be maintained in contact with the rim of the disks 10 and 11. For this purpose a spring 115 is secured at one end to the tab 47*c* and passes over an idler roll 116 and is anchored in a bracket 117 which is secured to the base plate 103.

In one embodiment of this invention the belts 21 and 22 were driven at a speed of 300 inches per second. The disks. such as disk 11 of FIG. 3, were 11.5" in diameter and were driven at a rotational speed of 150 r.p.m. In this case the relative velocity of a document relative to the velocity of the periphery of the disk is of the order of 200 inches per second. This difference in speed as a document enters a given slot will indicate the positive action present in applying a braking force to the document as it travels into the slot thus preventing damage to the leading edge of the document as would be the case if it were permitted to travel unchecked to the end of a given slot. In such a system eight spiral grooves were formed in each disk. Each groove was formed with two different radii of curvature and were laid out as indicated in FIG. 3. More particularly, there was established a first center of curvature E having coordinates of .32" and 2.26" respectively from the center of the disk to form the inner portions of each slot on an inner radius of 3.28" with the spiral width equaling .19". There was then established a second center of curvature F which had coordinates of .46" and zero respectively from the center of the disk 11. The outer portions of each slot were then formed from a center of curvature such as center F with an inner radius of 5.46". Each slot thus formed terminated in a relatively sharp tip G. Tips such as tip G were spaced 45° one from the other around the periphery of disk 11.

Referring now to FIG. 4, there is illustrated a modified guide system for insertion of documents into spiral slots. In place of the arcuate plates 30 and 31, FIG. 1, a plurality of rotary brushes 130–135, FIG. 4, are mounted with the perimeters thereof approximately tangent the perimeter of the slotted disk 10. The brushes 130–135 are mounted for rotation counter to the direction of rotation of disk 10 and are supported on individual axes which are driven by means such as motor 200, FIG. 1, so that documents traveling to the slotted disk 10 by way of belts 21 and 22 will be guided and propelled into slots by the combined action of the belts 21 and 22 and the brushes 130–135. If desired, the perimeters of the brushes 130 and 131 or additional brushes may overlap the perimeter of the disk 10 as in the case of the arcuate guide bars 30 and 31. Alternatively, the terminus of the conveyor belts 21 and 22 may be so located as to assure positive insertion of a given document into a slot.

Rotary brushes will be provided in accordance with the embodiment of FIG. 4 in number sufficient to assure the deposit of a document in a slot. Preferably the guide structure formed by the brushes will be limited to an arc subtended by an angle of the order of 90°. By this means the stripper bar may operate to extract documents from the spiral slots without interference from the last of the guide brushes such as brush 135.

It will be preferred that the brushes 130–135 be formed from fibrous materials, either plastic or natural, as contrasted with metallic brushes, although the latter may for some applications be found satisfactory.

FIG. 5 illustrates the relative positions of one disk and one set of brushes 130–135 as mounted on axes or shafts 140–145. Since the perimeters of the brushes overlap as indicated in FIG. 4, the brushes are axially offset one from another. In a preferred embodiment of the invention two sets of brushes will be provided, one set in place of each of the arcuate guide plates 30 and 31 of FIG. 1. It is to be understood, however, that more or less may be found satisfactory in given applications of the invention.

Delivery of documents to the stacking disks at the input or loading station may be in some instances accomplished solely by reason of an exact synchronization between the input conveyor means and the disks themselves. It is preferred, however, that the arcuate guides, as in the case of FIG. 1, or the brush guides, FIG. 4, be positioned as to lie at least in part slightly within the perimeter of the disks to assure positive insertion of a given document into a slot. Furthermore, the provision of the extracting means at the extracting station including the stripper bar which is tilted relative to the axis of the disks provides for the formation of a stack of documents that will permit removal of portions or all of the stack without interrupting the stacking operations.

More particularly, a force is applied to the leading edge of each document as it approaches the extracting zone, tending to tilt the document in the plane of its surface. This terminology is believed appropriate even though it is recognized that as the leading edge of the document reaches the extracting bar its surface is not planar but is arcuate. The extracting bar serves to tilt the axes of revolution of the document surface. The edge of the document adjacent the side element of the stacking bar thus is moved into contact with the side element and tends to slide downwardly along the side element. As the document slides down along the side element, it is bodily moved in direction parallel to the axis of rotation of the disks and toward the disks so that there is assured positive alignment of the sides of all documents adjacent the side element. As a result, the document stack is characterized by the leading edge of each document resting upon a surface of the extracting bar. A second side of each document is positioned against the side element of the stacking bin. A face of the first document in the stack rests against the planar surface of the bin stop element. A face of the last document placed in the stack is urged against the edges of the disks by the resilient force placed upon the bin stop. Thus any or all of the documents in the stack may be removed while maintaining the stacking operation.

Having described the invention in connection with certain specifiic embodiments thereof, it is to be understood that further modifications may now suggest themselves to those skilled in the art and it is intended to cover such modifications as fall within the scope of the appended claims.

What is claimed is:

1. A high speed document stacking mechanism which comprises a pair of disks each having a plurality of arcuate slots extending inwardly from the perimeters thereof, means for mounting said disks for rotation about a common axis with pairs of said slots in alignment, conveyor means terminating within the perimeter of said disks and between them for delivering documents into said slots in a loading zone substantially tangentially of said disks at a velocity in excess of the velocity of the perimeter of said disks for developing a frictional braking force between the surfaces of said documents and the outer surfaces of said slots to arrest the motion of each of said documents relative to said disks, guide means between said disks having an arcuate inner surface of shape and position substantially conforming with the perimeter of said disks in the region of said loading zone for guiding documents into said slots, a stripper bar extending between said disks to the region of the inner extremities of said slots, said bar being tilted at an angle with respect to the axis of said disks and sloping downwardly from the second of said guide means to tilt each of said documents in a plane parallel to said axis while stripping said documents from the slots in said disks, a stacking bin including said stripper bar for receiving documents stripped from said disks by said stripper bar, and resilient means for urging said documents against the outer edges of said disks to maintain said documents in substantially upright alignment.

2. A high speed document stacking mechanism which comprises a pair of disks each having a plurality of arcuate slots extending inwardly from the perimeters thereof, means for mounting said disks for rotation about a common axis with pairs of said slots in alignment, conveyor means terminating within the perimeter of said disks and between them for delivering documents into said slots in a loading zone substantially tangentially of said disks at a velocity in excess of the velocity of the perimeter of said disks for developing a frictional braking force between the surfaces of said documents and the outer surfaces of said slots to arrest the motion of each of said documents relative to said disks, a pair of arcuate guides lying in planes parallel to the planes of said disks with one of said guides between said disks, said guides having arcuate edges lying within the perimeter of said disks in the region of said loading zone, a stripper bar extending between said disks to the region of the inner extremities of said slots, said bar being tilted at an angle with respect to the axis of said disks and sloping downwardly from the second of said arcuate guides to tilt each of said documents as it is stripped from the slots in said disks, a stacking bin including said stripper bar for receiving documents stripped from said disks by said stripper bar, and resilient means for urging said documents against the outer edges of said disks to maintain said documents in substantially upright alignment.

3. In a high speed stacking mechanism the combination which comprises a pair of disks each having a plurality of arcuate slots extending inwardly from the perimeters thereof, means for mounting said disks for rotation about a common axis with pairs of said slots in alignment, a belt conveyor means terminating at least in part within the perimeter of said disks and between them for delivering sheet materials into said slots substantially tangentially of said disks at a velocity in excess of the velocity of the perimeter of said disks for developing a frictional braking force between the surfaces of said sheet materials and the outer surfaces of said slots to arrest the motion of each of said sheet materials relative to said disks, at least one stripper bar extending between said disks to the region of the inner extremities of said slots and forming at the point of registration therewith an angle of the order of 90° with respect to the inner surface of any portion of any of said slots, said bar being tilted at an angle with respect to the axis of said disks to tilt each of said sheet materials in a plane parallel to said axis as it is stripped from the slots in said disks, a stacking bin for receiving sheet materials stripped from said disks by said stripper bar, and resilient means for urging said sheet materials against the outer surface of said disks to maintain said stack in substantially upright alignment.

4. In a high speed mechanism for stacking documents the combination of a disk having a plurality of arcuate slots extending inwardly from the perimeter of the disk, means for rotating said disk about the center thereof at a predetermined peripheral velocity, means for delivering said documents into said slots tangentially of said disk in a loading zone at an entry velocity substantially in excess of said peripheral velocity for developing braking forces between the surfaces of said documents and the outer surfaces of said slots to arrest the motion of said documents relative to said disk, and a pair of inwardly facing arcuate guide means lying in planes parallel to the plane of said disk and on opposite sides thereof and having edges extending within the perimeter of said disk in the region of said loading zone.

5. In a high speed stacking mechanism the combination which comprises rotating disk means having a plurality of arcuate slots extending inwardly from the perimeter thereof for transport of separate flexible sheets from an input station to an output station, at least one stripper bar at said output station extending between elements of said disk means to the region of the inner extremities of said arcuate slots and forming an angle of the order of 90° with respect to the inner surface of any portion of any of said slots in registration with said bar, said bar being tilted at an angle with respect to the axis of said disk means to tilt each of said sheets as they are stripped from slots in said disk means.

6. In a high speed stacking mechanism in which disk means having arcuate slots are rotated about an axis to transport documents from an input station to an extracting station the combination which comprises a planar extracting bar extending into said disk means to the region of the axis of rotation thereof for engaging the leading edge of each of said documents as it approaches said extracting station, the plane of the contact surface of said extracting bar being angularly disposed with respect to said axis for applying to the leading eadge of each of said documents a force tending to tilt the document in the plane thereof, structure cooperating with said extracting bar forming a stacking bin and including a side element forming a planar surface perpendicular to the surface of said extracting bar, a movable stop adapted to travel along said stacking bin and having a planar surface substantially mutually perpendicular with respect to the surface of said extracting bar and said side element, and means for resiliently urging said stop toward said disk means for maintaining a document with said leading edge on a surface of said extracting bar, with one side engaging said side element, one face engaging said stop and the other face engaging said disk means.

7. In a high speed mechanism for stacking documents the combination of a disk having a plurality of arcuate slots extending inwardly from the perimeter of said disk, means for rotating said disk about the center to impart a predetermined peripheral velocity, means for delivering said documents into said slots tangentially of said disk in a loading zone at an entry velocity substantially in excess of said peripheral velocity for developing braking forces between the surfaces of said documents and the outer surfaces of said slots to arrest the motion of said documents relative to said disk, a pair of plates mounted adjacent to the periphery of said disk and supported in planes parallel to the plane of said disk but spaced on opposite sides thereof, said plates having curved inner surfaces facing the axis of said disk and lying within the perimeter of said disk in said loading zone and substantially tangent to the periphery of said disk over a substantial arc leading from said loading zone in the direction of said disk to oppose centrifugal forces on the tail of each document as it travels in a slot to prevent impaling of said documents on the tips of the spiral sections of the disks.

8. A high speed document stacking mechanism which comprises a pair of disks each having a plurality of arcuate slots extending inwardly from the perimeters thereof, means for mounting said disks for rotation about a common axis with pairs of said slots in alignment, conveyor means for delivering documents into said slots in a loading zone substantially tangentially of said disks at a velocity in excess of the velocity of the perimeter of said disks for developing a frictional braking force between the surfaces of said documents and the outer surfaces of said slots to arrest the motion of each of said documents relative to said disks, a pair of inwardly facing arcuate guides lying in planes parallel to the planes of said disks with one of said guides between said disks, said guides having arcuate edges lying within the perimeter of said disks in the region of said loading zone, a stripper bar extending to the region of the inner extremities of said slots, said bar sloping downwardly from the second of said arcuate guides to strip said documents from the slots in said disks, a stacking bin including said stripper bar for receiving documents stripped from said disks by said stripper bar, and resilient means for urging said documents against the outer edges of said disks to maintain said documents in substantially upright alignment.

9. A high speed stacking mechanism which comprises disk means having a plurality of elongated arcuate slots extending inwardly from the perimeter thereof, each of which corresponds with the locus of two different radii centered at points spaced from the center of said disk and tangent to one another substantially at a mid-point along the lengths of said slots, means for mounting and rotating said disk means about the center thereof, means for delivering sheet material into said slots tangentially of said disk means at a velocity in excess of the velocity of the perimeter of said disk means for developing a centrifugal braking force between said sheet material and the outer surfaces of said slots to arrest the motion of said sheet material relative to said disk means, and means for extracting said sheet material from said slots in the order of delivery thereof to said disk means.

10. In a high speed mechanism for stacking documents the combination of a disk having a plurality of arcuate slots extending inwardly from the perimeter of the disk, each of which corresponds with the locus of two different radii centered at points spaced from the center of said disk and tangent to one another substantially at a mid-point along the lengths of said slots, means for rotating said disk about the center thereof at a predetermined peripheral velocity, means for delivering said documents into said slots tangentially of said disk in a loading zone at an entry velocity substantially in excess of said peripheral velocity for developing braking forces between the surfaces of said documents and the outer surfaces of said slots to arrest the motion of said documents relative to said disk, and a pair of inwardly facing arcuate guide means lying in planes parallel to the plane of said disk and on opposite sides thereof and having edges extending within the perimeter of said disk in the region of said loading zone.

11. In a high speed mechanism for stacking documents the combination of a disk having a plurality of arcuate slots extending inwardly from the perimeter of the disk, each of which corresponds with the locus of two different radii centered at points spaced from the center of said disk and tangent to one another substantially at a midpoint along the lengths of said slots, the first of said radii substantially corresponding with the radius of said disk and the second of said radii of the order of one-half the radius of said disk, means for rotating said disk about the center thereof at a predetermined peripheral velocity, means for delivering said documents into said slots tangentially of said disk in a loading zone at an entry velocity substantially in excess of said peripheral velocity for developing braking forces between the surfaces of said documents and the outer surfaces of said slots to arrest the motion of said documents relative to said disk, and a pair of inwardly facing arcuate guide means lying in planes parallel to the plane of said disk and on opposite sides thereof and having edges extending within the perimeter of said disk in the region of said loading zone.

References Cited in the file of this patent

UNITED STATES PATENTS

| | | |
|---|---|---|
| 1,756,616 | Wood | Apr. 29, 1930 |
| 1,843,474 | Wood | Feb. 2, 1932 |
| 2,251,221 | Cleven | July 29, 1941 |
| 2,844,373 | Van Marle | July 22, 1958 |
| 2,850,281 | Heimlicher | Sept. 2, 1958 |

FOREIGN PATENTS

| | | |
|---|---|---|
| 852,005 | Great Britain | Oct. 19, 1960 |